United States Patent [19]

Knapp

[11] Patent Number: 4,978,951
[45] Date of Patent: Dec. 18, 1990

[54] MATRIX DISPLAY DEVICES WITH INTERCONNECTED DIODE RING CIRCUIT PROVIDING FAULT TOLERANCE

[75] Inventor: Alan G. Knapp, Crawley, England

[73] Assignee: U.S. Philips Corporation, New York, N.Y.

[21] Appl. No.: 297,820

[22] Filed: Jan. 13, 1989

[30] Foreign Application Priority Data

Feb. 24, 1988 [GB] United Kingdom ............... 8804326

[51] Int. Cl.$^5$ ............................................. G09G 3/36
[52] U.S. Cl. .................................. 340/784; 340/765; 340/719; 350/333
[58] Field of Search ............... 340/719, 718, 784, 765; 350/332, 333

[56] References Cited

U.S. PATENT DOCUMENTS

| | | | |
|---|---|---|---|
| 4,223,308 | 9/1980 | Baraff et al. | 340/784 |
| 4,251,136 | 2/1981 | Miner et al. | 340/784 |
| 4,642,620 | 2/1987 | Togashi et al. | 340/719 |
| 4,666,252 | 5/1987 | Yaniv et al. | 350/333 |
| 4,748,445 | 5/1988 | Togashi et al. | 340/784 |
| 4,794,385 | 12/1988 | Kuijk | 340/784 |

FOREIGN PATENT DOCUMENTS 2147135 5/1985 United Kingdom .
2129183 10/1986 United Kingdom .

Primary Examiner—Jeffery A. Brier
Attorney, Agent, or Firm—Bernard Franzblau

[57] ABSTRACT

An active, matrix addressed display device comprising an array of display elements (37), e.g. liquid crystal display elements, each connected in series with a diode ring type non-linear device (31) between associated row and column address conductors (34, 35). The non-linear device comprises two parallel conduction paths each containing at least three series-connected diode elements (e.g. A1–E1, A2–E2) which permit current flow in a respective direction. The conduction paths share one or more intermediate diode elements (e.g. B1 or B1–D1). The one or more intermediate diode elements may be interconnected, either individually or as a group, in parallel with diode element(s) (e.g. B2 or B2–D2 respectively) of the other conduction path thereby providing alternative branches for fault tolerance but using fewer diode elements than usual for such purposes. Alternatively, the one or more intermediate diode elements (e.g. B1–D2) of one conduction path may be interconnected in series between two diode elements (A2, B2) of the second conduction path so as to form the sole path between those two elements, thereby reducing the number of diode elements required for each non-linear element.

19 Claims, 6 Drawing Sheets

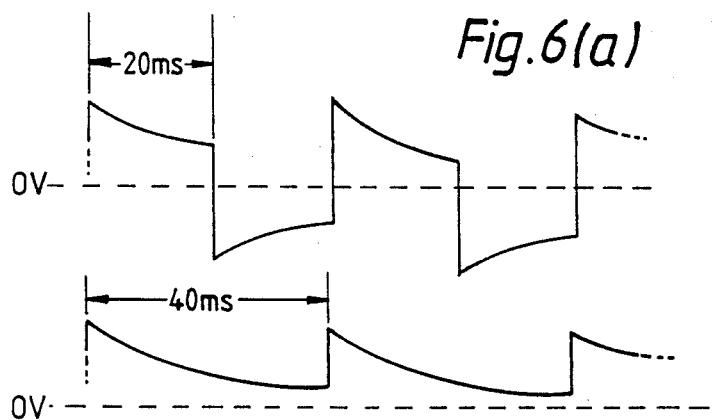
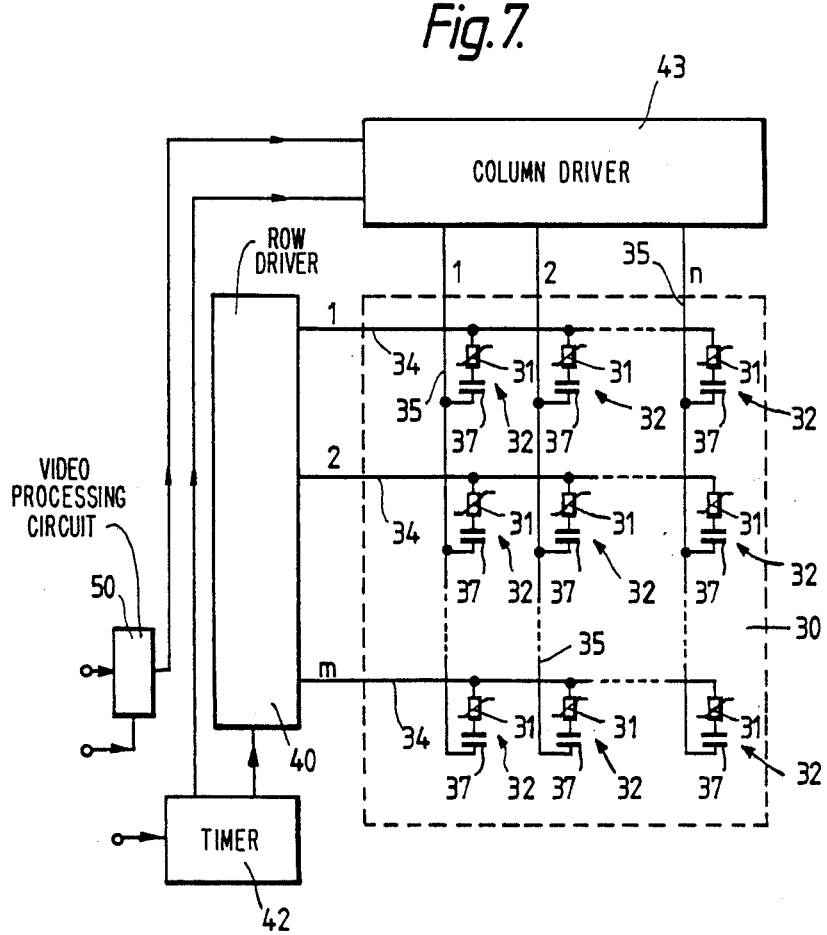

MATRIX DISPLAY DEVICES WITH INTERCONNECTED DIODE RING CIRCUIT PROVIDING FAULT TOLERANCE

BACKGROUND OF THE INVENTION

The present invention relates to a matrix display device comprising a plurality of row and column address conductors, a plurality of picture elements each comprising an electro-optical display element connected in series between a row conductor and a column conductor with an associated two terminal non-linear resistance device comprising a diode ring type circuit providing first and second conduction paths in parallel between the two terminals, each of which paths exhibits a threshold characteristic and contains at least three series-connected diode elements arranged to allow current flow through the circuit in respective opposite directions.

An active matrix display device of this kind is suitable for displaying alpha-numeric or video, e.g. TV information.

Matrix display devices of the above kind using diode elements and in which the electro-optical display elements comprise liquid crystal display elements are known, although other passive electro-optical media such as electrophoretic or electrochromic materials may be used instead.

In FIG. 1 of the accompanying drawings there is shown diagrammatically two examples of the basic circuit configuration of a typical picture element and its associated row and column conductors of a known form of matrix liquid crystal display device. In these circuits, each liquid crystal display element 12, constituted by a pair of spaced electrodes with liquid crystal material therebetween, is connected in series with a diode ring circuit type of bi-directional non-linear resistance device 14, comprising in these examples a pair of diodes connected in parallel with opposing polarities, i.e. in anti-parallel, between a row, scanning, conductor 16 and a column, data, conductor 18. The two forms of circuit configurations shown are electrically equivalent and perform in the same manner. The choice between them is made purely on technological grounds.

The transmission (T)-RMS voltage (Vlc) curve of the liquid crystal material, the current (I) voltage ($V_R$) characteristic of the diode ring circuit and the drive waveforms applied to the row and column conductors are illustrated in FIGS. 2, 3 and 4 respectively.

The purpose of the diode ring circuit is to act as a switch in series with the display element. When a given row of the display device is to be addressed the voltage applied to the row conductor concerned, illustrated by the waveform of FIG. 4a, is taken to one, Vs, of two selected voltage levels. In common with most other liquid crystal display systems, the polarity of the voltage applied across the liquid crystal display element is inverted every field (i.e. every 20 m.sec. for a PAL TV system) to prevent unwanted degradation of the liquid crystal material and generally poor image quality. Since the operation of the picture elements in the positive and negative cycles are exactly equivalent the following discussion will consider a cycle of only one polarity for simplicity.

During the "select" period ts (FIG. 4a), corresponding in the case of a TV display to a maximum of a line period, the voltage across a diode ring circuit and its associated display element (and other diode rings and display elements in the same row) causes the diode ring to operate in the charging part of the diode ring circuit characteristic indicated at C in FIG. 3. In this region the diode ring circuit current is large and the display element capacitance rapidly charges to a voltage, Vp, given by the expression:

$$Vp = Vcol - Vs - Vd, \quad (1)$$

where Vcol and Vs are respectively the voltage applied to the column conductor 18 at that time and the select voltage applied to the row conductor 16, and Vd is the forward voltage drop across the diode ring circuit at the end of the charging period. Vcol is derived, in the case of a TV display, by sampling the appropriate line of the incoming video signal in accordance with known practice. At the end of the select period ts the row voltage falls to a new, lower, and constant value Vh (FIG. 4a) which is selected so that the mean voltage across the diode ring circuit during the next approximately 20 milliseconds, corresponding to the usual field period for TV display less the duration of the period ts, when the row is next addressed again with a select voltage, is minimized. In theory, assuming an ideal situation, this sustain, or hold, voltage Vh is equal to the mean of the rms saturation and threshold voltages (as shown in FIG. 2), that is:

$$Vh = (Vsat + Vth)/2. \quad (2)$$

Under these conditions the maximum voltage of either polarity appearing across the diode ring circuit is equal to the peak to peak voltage on the column conductor, which in turn is equal to the difference between the rms saturation and threshold voltages Vsat and Vth. As the voltage across the diode ring circuit increases larger leakage currents flow through the diodes and vertical crosstalk appears. For a given level of display performance it is possible to derive a maximum acceptable diode voltage which is shown at Vdm in FIG. 3. This means that the display will only operate correctly if the condition:

$$Vsat - Vth < Vdm \quad (3)$$

is satisfied. Vdm can be controlled by using greater numbers of diodes for each display element or by varying the way in which the diodes are fabricated so that the slope of the diode I-V curve is changed. The latter approach only allows small changes to be produced so the main way in which the diode ring circuit characteristics can be matched to the liquid crystal is to increase the numbers of diode elements used until Vdm for the combination satisfies the above equation. Examples of known circuits of typical picture elements employing greater numbers of diode elements are shown in FIGS. 5a and 5b. The bidirectional non-linear resistance device shown in FIG. 5a consists of two sets of diode elements, each set having a plurality of diode elements connected in series with similar polarity for unidirectional conduction and the two sets being connected in parallel with opposing polarities. FIG. 5b shows an alternative form of circuit in effect comprising a number of series-connected diode rings each comprising a pair of diode elements connected in parallel and with opposing polarities. The two forms of circuit function in a similar manner electrically.

British Patent Specification No. 2129183A describes liquid crystal matrix display devices using diode ring circuits of the aforementioned kinds. Reference is invited to this specification for further details of the fabrication and operation of this type of display device.

Clearly, the smaller the difference between Vsat and Vth, the fewer diode elements are needed. However, a certain difference is needed to allow grey scale levels to be accurately reproduced. The use of the minimum number of diode elements is desirable for two reasons. First of all the chances of producing a faulty diode element increase as their number increases and so the yield of good displays becomes lower as the numbers increase. Secondly, for a display device operated in the transmission mode, and bearing in mind that the diode elements are usually fabricated side by side and situated adjacent an electrode of their associated display element on a substrate of the device, the effective optical transmission area of the display becomes smaller as more diode elements are used, making the display dimmer for a given backlight power.

The voltage across the display element resulting from driving in the above described manner has a waveform as depicted in FIG. 6a.

If the known forms of diode ring circuits shown in FIGS. 5a and 5b are used the effect of one diode element in the circuit becoming open circuit is that the diode ring circuit cannot conduct for one of the polarities of drive voltage and in this situation the voltage across the diplay element then has a waveform as shown in FIG. 6b. This signal has a different rms value from the correct one. The signal also has a large 25 Hz component as well as a large dc component. The combined effect of these characteristics is that the picture element has a different brightness, exhibits a 25 Hz flicker and does not respond to changes in drive signal in the same way as a normal picture element. Such a picture element is therefore seen as a visible defect in the display picture and renders the display device unacceptable for high quality display purposes. In order to alleviate this problem, British Patent Specification No. 2129183A, mentioned earlier, proposes to use two diode ring circuits for each picture element so that, in the event of one diode ring circuit being defective through an open-circuit diode element, the other diode ring circuit controls the display element as required to provide satisfactory operation. This proposal suffers from the disadvantage that the required duplication of non-linear resistance devices complicates manufacture and leads to a greater proportion of the display device's area being occupied by the non-linear resistance devices and therefore a lesser amount of active display area.

SUMMARY OF THE INVENTION

It is an object of the present invention to provide an improved matrix display device of the kind described in the opening paragraoh.

More particularly, it is an object of the present invention to provide a matrix display device using diode ring circuits as picture element switching devices which either offers a degree of fault tolerance capability without resort to duplication of the switching devices as described above or enables fewer diode elements to be used while retaining the same or similar operational performance whereby the chances of a fault occuring are reduced.

According to the present invention, a matrix display device as described in the opening paragraph is characterised in that at least one diode element intermediate the first and last diode elements of the first conduction path allowing current flow through the circuit in one direction is connected so as to form part of the second conduction path intermediate the first and last diode elements of the second conduction path capable of allowing current flow through the circuit in the opposite direction.

By arranging that at least one of the diode elements of one conduction path is in effect shared with the other conduction path, the possibility exists for a degree of fault tolerance to be incorporated in the non-linear resistance device. Alternatively, the number of diode elements needed to achieve the same or similar operational performance as the aforementioned known forms of diode ring circuits to be less than the number used in those known circuits thereby reducing the chances of a fault occuring due to the defective diode element or interconnection between diode elements.

As regards the possibility for a degree of fault tolerance, in one embodiment of the invention, and assuming, for this purpose the non-linear resistance device comprises a diode ring circuit having two sets of at least three series-connected diode elements with the sets connected electrically in parallel but with opposing polarities, the at least one diode element of the first conduction path may be interconnected in the second conduction path in parallel with at least one, and preferably a corresponding number, of further diode elements of the second conduction path. If all the diode elements of the non-linear resistance device are operating correctly, then this arrangement operates in the same way as in the situation with known forms of circuits where the diode elements of both conduction paths are dedicated solely to their respective paths, except that the at least one diode element is always in parallel with a corresponding number of further diode elements of the second conduction path. However, in the event of one, or more, of these further diode elements becoming open circuited, then the parallel-connected one or more diode elements of the first conduction path serve to maintain proper operation of the second conduction path. Conversely, if one or more of the diode elements of the first conduction path forming part of the parallel arrangement becomes open circuited, then the parallel connected one, or more, further diode elements of the second conduction path serve to maintain proper operation of the first conduction path. It is seen, therefore, that the non-linear resistance device has a degree of fault tolerance and that, by virtue of the fact that one or more diode elements of the first conduction path is shared with the second conduction path, this degee of fault tolerance is not achieved with an increase of the number of diode elements, but simply by the provision of suitable interconnections. In addition to being tolerant of open circuit diode elements in this manner, the non-linear resistance device is tolerant also of a defect or error in growing or defining one of the parallel-connected diode elements which results in a larger forward voltage drop than expected. Any such defect or error has no significant effect on the display element voltage so that the uniformity of picture display brightness remains as intended and is not impaired.

Moreover, if one of the parallel-connected diode elements becomes short-circuited, it can be cut out of circuit, for example, using a laser scribing technique, to convert the short to an open circuit to which the device is tolerant.

By way of example, each conduction path may comprise a set of three series-connected diode elements, the two sets being connected in parallel between the display element and a row conductor and their diode elements having opposing polarities. The terminals of the middle diode elements of each set are cross-connected so as to be electrically parallel with one another independently of the parallelism of the two sets. If one of the middle diode elements should prove defective then the parallel-connected middle diode element of the other set assures proper operation of the affected conductive path. Thus, in this example, the non-linear resistance device according to the invention is tolerant of defects in either of two of the six diode elements.

It is more usual in the case of liquid crystal matrix display devices for each conductive path of the non-linear resistance device to have more than three diode elements in order to match the properties of currently-available liquid crystal materials.

Even greater advantages can be obtained for non-linear resistance devices comprising two sets, each having the same number, n, of series-connected diode elements and where n is greater than three. In this case two or more diode elements of one set intermediate the first and last diode elements may be connected in parallel with two or more diode elements of the other set intermediate the first and last diode elements. The parallel connection may be on an individual, one to one, basis or alternatively a group of two or more adjacent diode elements of one set may be connected in parallel with a corresponding number of adjacent diode elements of the other set. In either case, the non-linear resistance device is tolerant of two, or more, defective diode elements in accordance with the number of diode elements interconnected in parallel.

For example, in the case of the non-linear resistance device having two sets of five series-connected diode elements the second and fourth diode elements of one set may be interconnected in parallel with respectively the second and fourth diode elements of the other set thus making the device redundant against four out of the ten diode elements failing. Alternatively, the group consisting of the second, third and fourth diode elements of one set may be interconnected in parallel with the corresponding group of diode elements of the other set, making the device redundant against failure of six out of the ten diode elements. The latter arrangement has the further advantage that it is tolerant of two or three of the second, third and fourth diode elements of either the first or second set failing. In a particularly favourable modification of the latter kind of arrangement where groups of diode elements are interconnected, individual diode elements within the groups are in addition interconnected separately. With regard to the above example hving five diode elements in each set and in which groups of three intermediate diode elements are interconnected, the third diode element of one set may thus also be interconnected in parallel separately with the third diode element of the other set. The modified arrangement is then tolerant of any of the six intermediate diode elements in either set becoming open circuit and also of various combinations of several of these diode elements becoming open circuit.

Preferably, and where possible, in order to improve yields the diode elements of each non-linear resistance device are formed on a substrate of the device with associated interconnections providing the required first and second conduction paths in a physical arrangement which avoids cross-overs of the interconnections on the substrate.

This may be achieved conveniently by physically arranging the diode elements of each non-linear resistance device to form two electrical series of diode elements with both ends of one series being connected to the associated address conductor and both ends of the other series being connected to the associated display element. The diode elements are ordered in the two series such that interconnections between certain junctions of diode elements in both series provide the required first and second conduction paths.

In order to provide still further fault tolerance, the non-linear resistance device may include a further four diode elements each connected electrically in parallel with, respectively, the first and last diode elements of each set. Thus, in the case of the arrangement described above offering redundancy against failure of six out of the ten diode elements of the two sets, the provision of these further four diode elements means that the non-linear resistance device so obtained is rendered tolerant of an open circuit in any diode element, and that any short circuit can be repaired. Although it is necessary to provide additional diode elements to obtain this high degree of tolerance, the total number of diode elements employed, fourteen in the above example, is still considerably less than the number required by earlier proposals for achieving a similar degree of tolerance where complete parallel diode ring circuits in parallel are required, making a total of twenty diode elements.

Besides allowing fault tolerance in the above-described manner, the invention also offers, as mentioned previously, the possibility of reducing the number of diode elements necessary compared with known diode ring circuits while still providing substantially the same operational characteristics. Such a reduction means that, for a given probability of one diode failing, the chances of a faulty picture element occuring in a given size of display device are likewise reduced.

In another embodiment of the display device in which this reduction is obtained, the first conduction path comprises a set of series-connected diode elements allowing current flow through the non-linear resistance device in a first direction, as before, while the second conduction path is constituted solely by a set of series-connected diode elements which includes said at least one intermediate diode element of the first conduction path, the said at least one intermediate diode element being interconnected in the second conduction path in series between two diode elements so as to allow current flow therethrough in the opposite direction to the first conduction path and forming the only path for the opposite direction current flow.

This embodiment can be regarded as being similar to the previously-described embodiment except that the parallel-connected diode elements in the second conduction path are omitted. In other words those diode elements of the previous embodiment to which the circuit is fault tolerant are not used. Although the fault tolerance capability is therefore absent, this embodiment has the advantage that the total number of diode elements necessary is reduced by virtue of the sharing of one or more diode elements of the first conduction path with the second conduction path thereby reducing the chances of a defective diode element being present in the first place.

Although the invention is particularly useful in liquid crystal matrix display devices, it can also be used to advantage in matrix display devices using other passive electro-optical materials.

BRIEF DESCRIPTION OF THE DRAWINGS

Matrix display devices, in accordance with the present invention, will now be described, by way of example, with reference to the accompanying drawings, in which:

FIGS. 6a and 6b illustrate the voltage waveforms appearing across the display element of a picture element in a display device using the non-linear resistance device of FIGS. 5a and 5b and when driven using the drive waveforms shown in FIGS. 4a and 4b for situations in which the diode elements of the devices are operating properly and in which one diode element of the device is open circuited, respectively;

FIG. 7 is a simplified block diagram of a liquid crystal matrix display device in accordance with the invention intended to display TV pictures and which comprises an array of individually-addressable picture elements each consisting of a display element in series with a non-linear resistance device between associated row and column conductors;

DESCRIPTION OF THE PREFERRED EMBODIMENTS

Figure 3:
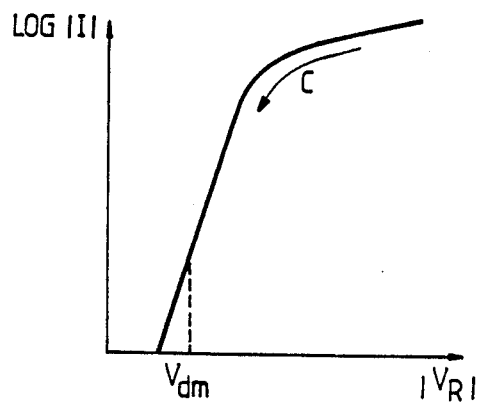
FIG. 3 illustrates graphically the current-voltage curve of a bidirectional non-linear resistance device exhibiting a threshold characteristic.

Referring to FIG. 7, there is shown schematically and in simplified form a block diagram of an LCD-TV matrix display device whose active matrix addressed liquid crystal display panel 30 consists of m rows (1 to m) with n horizontal picture elements 32 (1 to n) in each row. In practice, the total number of picture elements (m.n) in the matrix array of rows and columns may be 200,000 or more. Each picture element 32 consists of a liquid crystal display element 37 connected electrically in series with a bidirectional non-linear resistance device 31, which exhibits a threshold characteristic and acts as a switching element, between a row conductor 34 and a column conductor 35. The current/voltage characteristic of the devices 31 is as shown in FIG. 3. The picture elements 32 are addressed via these sets of row and column conductors 34 and 35 which are in the form of electrically conductive lines carried on respective opposing faces of two, spaced, glass supporting plates (not shown) also carrying the electrodes of the liquid crystal display elements. The two sets of conductors extend at right angles to each other with the picture elements located at their cross-over regions.

Figure 1A:
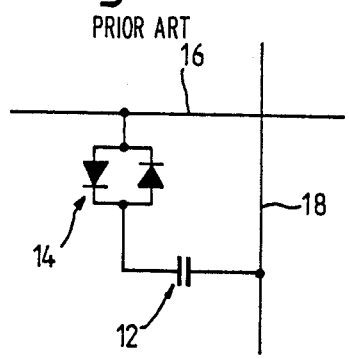
FIGS. 1a and 1b illustrate two forms of circuits of a typical picture element connected between respective row and column address conductors in a known liquid crystal matrix display device using diode ring circuits as bidirectional non-linear resistance devices.
Figure 1B:
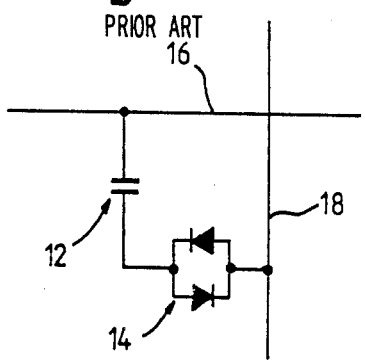
Figure 2:
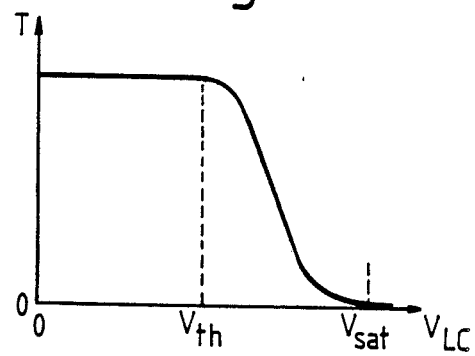
FIG. 2 illustrates graphically the transmission-voltage characteristic of a liquid crystal display element.

The row conductors 34 serve as scanning electrodes and are controlled by a row driver circuit 40 which applies a scanning signal to each row conductor 34 sequentially in turn. In synchronism with the scanning signals, achieved by means of the timing circuit 42, data signals are applied to the column conductors 35 from column conductor driver circuit 43 connected to the output of a video processing circuit 50 to produce the required display from the rows of picture elements associated with the row conductors 34 as they are scanned. In the case of a video or TV display system these data signals comprise video information. By appropriate selection of the scanning and data signal voltages, the optical transmissivity of the display elements 37 of a row are controlled to produce the required visible display effect. The display elements 37 have a transmission/voltage characteristic generally as shown in FIG. 2 and are only activated to produce a display effect in response to the application of both the scanning and data signals to the picture elements 32 by means of the non-linear devices 31. The individual display effects of the picture elements 32, addressed one row at a time, combine to build up a complete picture in one field, the picture elements being refreshed in a subsequent field.

Using the transmission/voltage characteristics of a liquid crystal display element, as depicted in FIG. 2, grey scale levels can be achieved.

The voltage/conduction characteristic of each of the two-terminal non-linear devices 31 is bidirectional and substantially symmetrical with respect to zero voltage so that by reversing the polarity of the scanning and data signal voltages after, for example, every complete field a net dc bias across the display elements is avoided.

Active matrix liquid crystal display systems employing two terminal non-linear resistance devices as switching elements in series with the display elements are generally well known and hence the foregoing description of the main features and general operation of the display device with regard to FIG. 7 has deliberately been kept brief for simplicity. For further information, reference is invited to earlier publications describing such types of display systems, such as, for example, U.S. Pat. No. 4,223,308 and British Patent Specification No. 2,147,135, both describing the use of diode structures as non-linear switching devices, details of which are incorporated herein.

In the display device of FIG. 7 the non-linear devices 31 comprise diode ring type circuits. In this respect, the display device has similarities with those described in British Patent Specification No. 2129183A mentioned earlier, details of which are incorporated herein, although, in accordance with the invention the nature of the diode ring circuits used is different, as will be described.

Figure 4A:
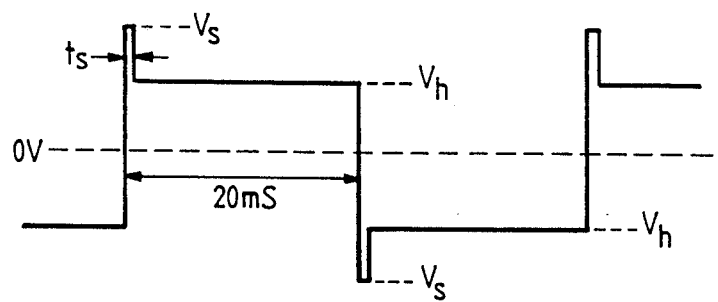
FIGS. 4a and 4b show examples of the waveforms applied to a row and a column address conductor, respectively for driving picture elements of the known display device.
Figure 4B:
Figure 5A:
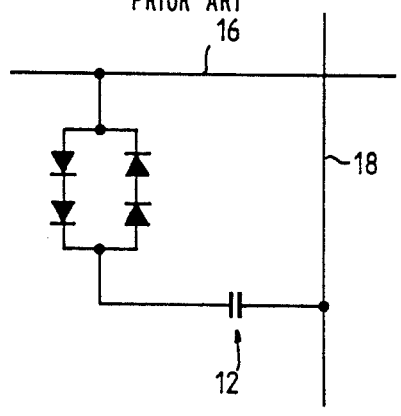
FIGS. 5a and 5b show two examples of known diode ring circuit types of non-linear resistance devices used in a liquid crystal matrix display device and employing a large number of diode elements needed to match the properties of the liquid crystal material.
Figure 5B:
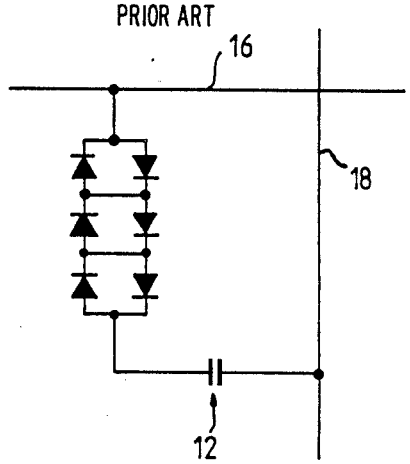

Row scanning in the matrix display device is accomplished conventionally using a waveform comprising a row select signal portion of duration ts and magnitude Vs followed immediately by a sustain, or hold, signal portion of lower, but similar polarity, voltage Vh for the remainder of the field period, as shown in FIG. 4a. The column conductors 35 are addressed with data (video) signal waveforms as shown, for example, in FIG. 4b. The sign (e.g. polarity) of the addressing signals is reversed after every field.

In accordance with the invention, the display device uses an improved form of diode ring circuit. The diode ring circuits, as with known types of circuits described in British Patent Specification No. 2129183A, comprise an arrangement of diode elements providing first and second conduction paths between a first terminal of the circuit connected to a row conductor 34 and a second terminal connected to an electrode of the display element 37, each of which paths consists of a set of at least three diode elements connected in series and exhibiting a voltage/current threshold characteristic. The diode elements of each path are arranged to permit unidirectional current flow in opposite directions respectively.

However, the diode ring circuits used as non-linear resistance devices in the present invention differ from the aforementioned known diode ring circuits in that at least one diode element intermediate the first and last diode elements of one of the conduction paths allowing current flow through the circuit in one direction is interconnected so as also to form a part of the second conduction path intermediate the first and last diode elements of the second conduction path capable of allowing current flow through the circuit in the other direction. Such a diode ring circuit arrangement can be used either to provide a fault tolerance capability or to simplify the diode ring circuit compared with a known diode ring circuit offering similar performance by reducing the total number of diode elements necessary.

As regards the former, the cross connection of one or more diode elements of one conduction path in the other conduction path can mean that, when the other conduction path already contains a set of series-connected diode elements, alternative branches through the circuit are available for the display element charging currents so that in the event of a certain one, or more, diode elements proving to be open circuit through a defect in the diode element itself or in its interconnections, the diode ring circuit is able to continue to function as desired using the alternative branch available.

As regards the latter, the interconnection of one or more diode elements of one conduction path with the other conduction path in such a manner that the one or more diode elements form just one possible current flow path in the other conduction path with that one, or more, diode elements in effect being common to, and shared between, both conduction paths, the number of diode elements necessary to obtain operational properties to a conventional diode ring circuit is reduced, leading to a corresponding reduction in the chance of an open-circuit diode element occuring.

Various examples of diode ring circuits for an embodiment of the invention offering fault tolerance are shown in FIGS. 8a–g.

Figure 8A:
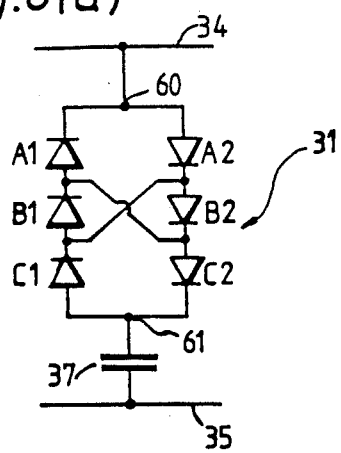
FIGS. 8a, b, c, d, e, f and g show various forms of the circuit of a non-linear resistance device used in one embodiment of a matrix display device according to the present invention providing fault tolerance.

Referring to FIG. 8a, there is shown the circuit of a typical one of the picture elements of the display device using one form of diode ring circuit in accordance with the invention. The diode ring circuit, 31, has two terminals, 60 and 61, connected respectively to a row conductor 34 and to an electrode of the associated display element 37. Between these terminals, two sets of three series-connected diode elements A1, B1, C1 and A2, B2, C2, are connected in parallel and with opposing polarities, as shown, forming first and second conduction paths through the diode ring circuit allowing, respectively, opposite current flows for charging the display element 37 as in known diode ring circuits. The circuit differs from known circuits, however, in that the middle diode elements in each set, B1 and B2, are cross-connected as shown in FIG. 8a using two cross coupling connections whereby diode element B2 is connected electrically in parallel with diode element B1 in one set and, conversely, diode element B1 is connected electrically in parallel with diode element B2 in the other set. If all the diode elements are operating correctly, then the diode ring circuit behaves as the known diode ring circuit, except that diode elements B1 and B2 are always in parallel. This parallelism means, however, that if one of the diode elements B1 and B2 becomes open circuited, for example, if there is a defect in the diode element or a break in one of its interconnections, affecting the diode element B2, the diode ring circuit is still able to operate correctly with the diode element B1 allowing current flow through the second conduction path in the appropriate sense as required. In addition, any defect or error in growing or defining one of the diode elements B1 and B2 which results in a larger forward voltage drop than normal has no significant effect on the voltage obtained across the display element. Finally, if one of the diode elements B1 and B2 should be found to be short circuited, it can be cut out of the circuit, using a laser scribing technique, to convert the short circuit to an open circuit to which the circuit is tolerant.

It is seen therefore that the described six diode element circuit is tolerant of faults in either of two of the diode elements.

With liquid crystal materials currently available, it is usually necessary to employ more than three diode elements for each conduction path of the diode ring circuit in order to match the properties of the material. Typically, four, five or possibly six or more diode elements are needed in a conduction path. For these diode ring circuits the invention provides even greater advantages.

Figure 8B:
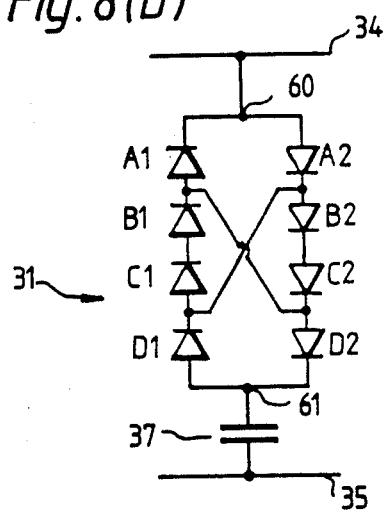

FIG. 8b shows a circuit diagram of a picture element in accordance with the invention having a diode ring circuit 31 comprising a set of four series-connected diode elements A1, B1, C1, D1 and A2, B2, C2, D2, in respective conduction paths between terminals 60 and 61. The two adjacent diode elements B1 and C1 in the first conduction path intermediate the first and last diode elements A1 and D1 are cross-connected with the second conduction path in parallel with the two intermediate diode elements B2 and C2 of the other set to form a part of the second conduction path. In the event of diode element B2 or C2 becoming open circuit, the second conduction path is maintained by virtue of the interconnected diode elements B1 and C1. Conversely, if diode element B1 or C1 becomes open circuited, the first conduction path continues to function using diode elements B2 and C2. Thus, the circuit is tolerant of a fault in four out of the eight diode elements concerned.

Figure 8C:
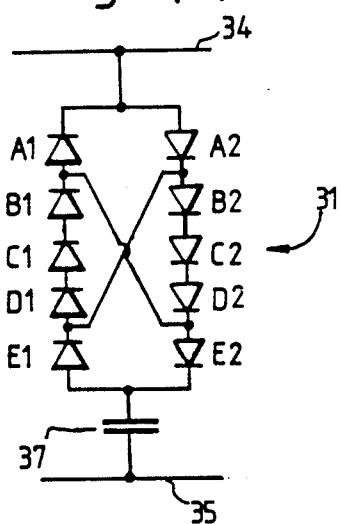
Figure 8D:
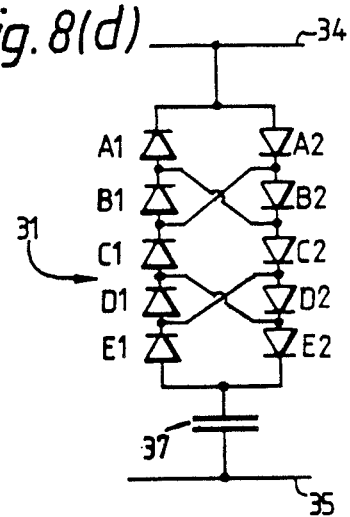

FIGS. 8c and 8d show two possible examples of diode ring circuits in accordance with the invention having a set of five series connected diode elements in each conduction path. In the circuit of FIG. 8c, the group of three series-connected diode elements B1, C1, D1 intermediate the first and last diode elements A1 and E1 of the set of elements comprising the first conduction path are cross-connected to the second set in parallel with the corresponding group of three intermediate diode elements B2, C2, D2 of the second set to form a part of the second conduction path. In the circuit of FIG. 8d, the diode elements B1 and D1 of the one set are individually cross-connected in parallel with the diode elements B2 and D2 of the second set.

The diode ring circuit of FIG. 8c is redundant against failure of six out of the ten diode elements involved (B1, B2, C1, C2, D1 or D2) while the diode ring circuit of FIG. 8d is redundant against failure of four out of the ten diode elements (B1, B2, D1 or D2). The circuit of FIG. 8c is also tolerant of two or three of the diode elements B1, C1 and D1, or B2, C2 or D2 failing at the same time.

Figure 8E:
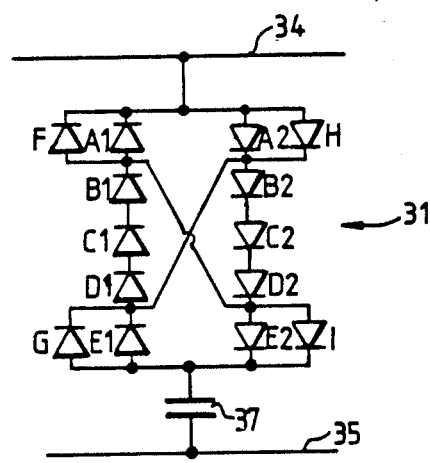

FIG. 8e shows the circuit of a modified form of the diode ring circuit of FIG. 8c in which four further diode elements, F, G, H and I, are connected respectively in parallel with, and with the same polarity as, the diode elements A1, E1, A2 and E2. Through the addition of four diode elements in this manner, the diode ring circuit is tolerant of an open circuit in any diode element and the effect of any short circuited diode element can be repaired by cutting out the diode element concerned from the circuit, for example, by laser scribing, to render that element, in effect, an open circuit.

Figure 8F:
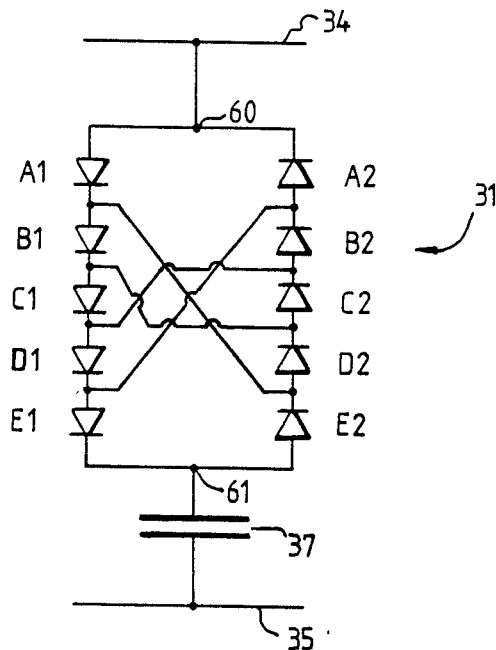

FIG. 8f shows a further form of a ring circuit with five series-connected diode pairs as in the non-linear element arrangement of FIG. 8c but with two further links. In addition to the series group of three diode elements B1, C1 and D1 in one set being interconnected in parallel with the series group of three diode elements B2, C2 and D2 of the other set, the diode elements C1 and C2 are also separately interconnected in parallel. This arrangement is tolerant of open circuit failures of more combinations of diode elements than the arrangement of FIG. 8c. For example, the failure of diode elements B2 and C1, which would produce an open circuit in the circuit of FIG. 8c, still leaves operational conduction paths via E2, D2, C2, D1, A2 and A1, B1, C2, D1, E1 in the circuit of FIG. 8f.

Figure 8G:
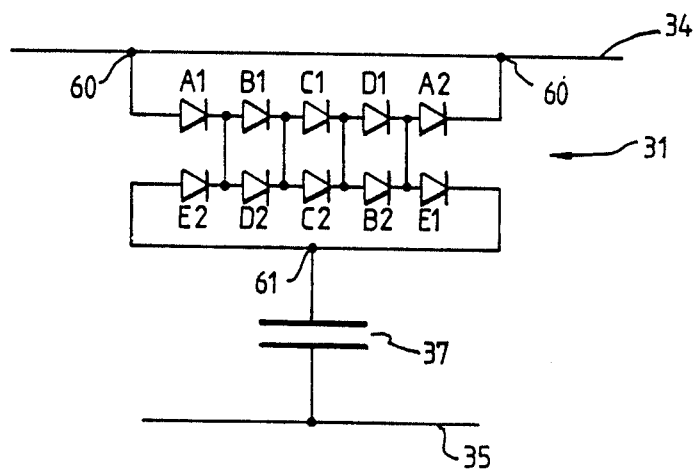

The particular circuit configuration illustrated in FIG. 8f involves a number of cross-overs and as a result might possibly cause yield problems in manufacture due to shorts occuring at cross-overs. However, FIG. 8g shows a diode ring circuit which electrically is identical but whose layout is configured differently so as to avoid cross-overs, and therefore avoids the associated problems. The diode elements are formed in two series, the ends of one series being connected together at the row conductor 34 and the ends of the other series being connected together at the display element 37. By arranging the diode elements in the two series in particular orders and providing interconnecting leads between junctions of diode elements in both series as shown, the desired two conduction paths equivalent electrically to those of FIG. 8f are obtained.

A similar re-arrangement of the components could likewise be applied to the circuits of FIGS. 8a, b, c and e to remove cross-overs. For example, with regard to the circuit configuration of FIG. 8a, the series of diode elements connected to the row conductor 34 and the display element 37 respectively could comprise A1, B1 and A2 and C2, B2 and C1 in those orders with interconnections between corresponding junctions between diode elements in both series. Similarly, for the circuit configuration of FIG. 8c, the series of diode elements connected to the row conductor 34 and the display element 37 respectively comprise A1, B1, C1, D1 and A2, and E2, D2, C2, B2 and E1 in those orders and with connections between the junction of A1 and B1 and the junction of E2 and D2, and between the junction of D1 and A2 and the junction of B2 and E1.

An embodiment of the invention offering a reduction in the number of diode elements needed in a diode ring circuit to obtain a given performance compared with conventional diode ring circuits, and hence a corresponding reduction in the chances of a defective diode element in the non-linear resistance devices of the display device occuring, will now be described with regard to FIGS. 9a and 9b which illustrate the circuit configurations of two examples of diode ring circuits providing respectively five and three series-connected diode elements in each conduction path of the diode ring circuit.

Figure 9:
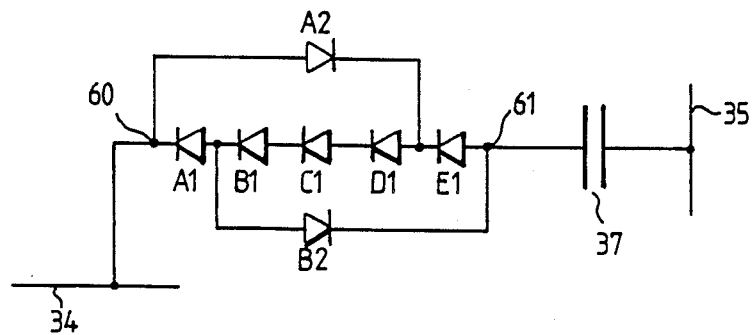
FIGS. 9a and 9b show two forms of the circuit of a non-linear resistance device used in another embodiment of a matrix display device according to the present invention using fewer diode elements.
Figure 9:
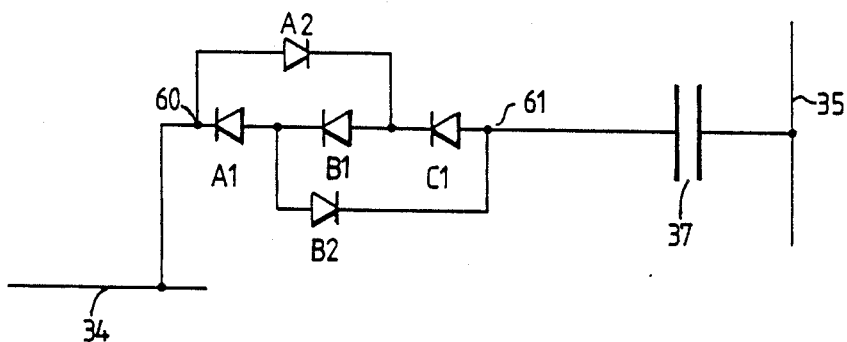

Referring to FIG. 9a, a set of five diode elements A1, B1, C1, D1 and E1 are connected in series with the same polarity between the terminals 60 and 61 and constitutes the first conduction path. Two further diode elements A2 and B2 are connected respectively in parallel with the group of diode elements A1, B1, C1 and D1 and the group of diode elements B1, C1, D1 and E1 but with opposite polarity. It will be seen that this circuit is equivalent to that of FIG. 8c with one of the diode elements B2, C2 and D2 of that circuit being in an open circuit condition.

The second conduction of the circuit in this case comprises the series-connected diode elements A2, D1, C1, B1 and B2. Thus the group of diode elements B1, C1 and D1 is common to both conduction paths.

Compared with the circuit of FIG. 8c, the diode ring circuit shown in FIG. 9a lacks the described fault tolerance capability but has the advantage that the number of diode elements employed is reduced from ten to seven while virtually the same current-voltage characteristics are retained. Compared with a known form of diode ring circuit comprising simply two sets of five series-connected diode elements arranged in parallel with opposing polarities and without cross-connection, and hence fault tolerance capability, substantially the same sectional performance is achieved by the circuit of FIG. 9a but using only seven diode elements. Of course, the polarities of the diode elements A1, B1, C1, D1 and E1, and A2 and B2 respectively may be in the opposite sense to those shown.

FIG. 9b shows a similar circuit arrangement but in this case each conduction path of the diode ring circuit consists of only three series-connected diode elements.

The novel principle can be applied to diode ring circuits requiring three or more series-connected diode elements in each of the two conduction paths. In comparison to a version of a known form of diode ring circuit having N series-connected diode elements in each of the two parallel conduction paths, making 2N diode elements altogether, the electrically equivalent version of the diode ring circuit using this principle has only N+2 diode elements. The smaller number of diode elements means that for a given probability of one diode element failing the chance of a faulty picture element occuring in the display device now is reduced. In addition, the smaller number of diode elements required allows the area of the display element, and thus the display transmission, to be larger The invention leads therefore, in one embodiment, to a display device whose diode ring circuits are tolerant of many open circuit faults and repairable for many short circuit diode element faults. Moreover, very little additional space is needed to accommodate the extra interconnections necessary to achieve the important advantage offered by the redundancy scheme so that there is negligible effect on the transparent display element area, and hence on the display transmission and picture brightness.

In the other embodiment, the invention leads to a reduction of the number of diode elements in the diode ring circuits, thereby reducing the chances of a faulty picture element occuring and offering the possibility of a larger transmission area.

The diode elements and their interconnections forming the diode ring circuits may be fabricated using any suitable conventional technology, for example, in a manner similar to that described in British Patent Specification No. 2129183A. Preferably the diode elements are formed as amorphous silicon p-i-n devices.

Although in this specification reference is made to row and column conductors, it will be appreciated that the invention is applicable to display devices in which the described row and column conductors are interchanged with the row conductors becoming the column conductors and vice versa.

I claim:

1. A matrix display device comprising a plurality of row and column address conductors, a plurality of picture elements each comprising an electro-optical display element connected in series with an associated two terminal non-linear resistance device between a row conductor and a column conductor, said non-linear resistance device comprising a diode ring type circuit providing first and second conduction paths in parallel between the two terminals, each of which paths exhibits a threshold characteristic and contains at least three series-connected diode elements arranged to allow current flow through the display element in respective opposite directions, and means connecting at least one diode element intermediate the first and last diode elements of the first conduction path, which first path allows current flow through the display element in one direction, such that said at least one diode element forms a part of the second conduction path intermediate the first and last diode elements of the second conduction path whereby the second path is capable of allowing current flow through the display element in the opposite direction.

2. A matrix display device according to claim 1, wherein each non-linear resistance device comprises a diode ring type circuit having two sets of at least three series-connected diode elements with the sets connected electrically in parallel but with opposing polarities, and wherein said at least one diode element of the first conduction path is interconnected in the second conduction path in parallel with at least one further diode element of the second conduction path.

3. A matrix display device according to claim 2, wherein the at least one diode element of the first conduction path is interconnected in parallel with a corresponding number of further diode elements of the second conduction path.

4. A matrix display device according to claim 3, wherein each conduction path contains at least four diode elements, and a plurality of diode elements of the first conduction path are interconnected with a plurality of diode elements of the second conduction path on an individual pair basis.

5. A matrix display device according to claim 3 wherein each conduction path contains at least four diode elements and a group of two or more adjacent diode elements in the first conduction path is interconnected in parallel with a group of a corresponding number of diode elements of the second conduction path.

6. A matrix display device according to claim 5, wherein the groups comprise at least three adjacent diode elements and at least one diode element of the group of diode elements of the first conduction path is also interconnected separately in parallel with a respective diode element of the group of diode elements of the second conduction path.

7. A matrix display device according to claim 6, wherein each non-linear resistance device further includes respective diode elements connected electrically in parallel with the first and last diode elements of each of the first and second conduction paths.

8. A matrix display device according to claim 2, wherein the diode elements of each non-linear resistance device are formed on a substrate of the device with associated interconnections of the first and second conduction paths in a physical arrangement which avoids cross-overs of the interconnections on the substrate.

9. A matrix display device according to claim 8, wherein for each non-linear resistance device the diode elements are arranged physically to form two electrical series of diode elements with the ends of one series being connected to an associated address conductor and the ends of the other series being connected to the associated display element, the diode elements being ordered in the two series such that interconnections between certain junctions of diode elements in both series provide the required first and second conduction paths.

10. A matrix display device according to claim 1, wherein the first conduction path comprises a set of at least three series-connected diode elements allowing current flow through the non-linear resistance device in a first direction, wherein the second conduction path is constituted solely by a set of series-connected diode elements which includes said at least one intermediate diode element of the first conduction path, said at least one intermediate diode element being interconnected in the second conduction path in series with and between two diode elements of the second path so as to allow current flow through the display element in the opposite direction to that allowed by the first conduction path and forming the only path for the opposite direction current flow.

11. A matrix display device according to claim 10, wherein the second conduction path includes a group of adjacent series-connected diode elements of the first conduction path.

12. A matrix display device according to claim 1, wherein characterised in that the electro-optical display elements comprise liquid crystal display elements.

13. A matrix display device according to claim 2, wherein each non-linear resistance device further includes respective diode elements connected electrically in parallel with the first and last diode elements of each of the first and second conduction paths.

14. A matrix display device as claimed in claim 2 wherein each conduction path contains at least four diode elements and a plurality of diode elements of the first conduction path are interconnected with a corresponding plurality of diode elements of the second conduction path on an individual pair basis.

15. A matrix display device as claimed in claim 2 wherein a group of two or more adjacent diode elements in the first conduction path is interconnected in parallel with a group of a corresponding number of diode elements of the second conduction path.

16. A matrix display device comprising:
at least first and second address conductors,
a picture display element connected in series with a two terminal non-linear device between said first and second address conductors,
said non-linear device comprising first and second conduction paths connected in parallel between its two terminals wherein the first path includes at least three series connected diode elements polarized to pass current from a first of said two terminals to a second of said two terminals and the second path also includes at least three series connected diode elements but polarized to pass current from the second to the first of said two terminals, and
means connecting at least one intermediate diode element in the first path to at least one intermediate diode element of the second path such that said one intermediate diode element of the first path forms an intermediate diode element of the second path whereby the second path can pass a current through said non-linear device and said display element despite an open-circuit condition of a given element of the second path.

17. A matrix display device as claimed in claim 16 wherein first and last diode elements in said first path have a respective free anode and cathode connected in common to one address conductor and first and last diode elements in said second path have a respective free anode and cathode connected in common to a terminal of said picture display element, and said connecting means connects intermediate diode elements of said first path in parallel with corresponding intermediate diode elements of said second path.

18. A matrix display device as claimed in claim 16 wherein said connecting means connects said at least one intermediate diode element of the first path in parallel with said at least one intermediate diode element of the second path.

19. A matrix display device as claimed in claim 16 wherein said connecting means connects a given number of consecutive adjacent intermediate diode elements of the first path in parallel with a corresponding given number of consecutive adjacent intermediate diode elements of the second path.

* * * * *